(12) United States Patent
Haney et al.

(10) Patent No.: US 6,293,771 B1
(45) Date of Patent: Sep. 25, 2001

(54) MANUALLY-POWERED APPARATUS FOR POWERING A PORTABLE ELECTRONIC DEVICE

(75) Inventors: Paul Steven Haney, Noblesville, IN (US); Ronald Leroy Lytel, New York, NY (US); Paul Michael Pierce; David Evan Schultz, both of Indianapolis, IN (US)

(73) Assignee: Thomson Licensing S.A., Boulogne-Cedex (FR)

( * ) Notice: Subject to any disclaimer, the term of this patent is extended or adjusted under 35 U.S.C. 154(b) by 0 days.

(21) Appl. No.: 09/428,620

(22) Filed: Oct. 27, 1999

Related U.S. Application Data

(60) Provisional application No. 60/105,719, filed on Oct. 27, 1998.

(51) Int. Cl.[7] .............................. F04B 9/14; F04B 17/00; F04B 35/00
(52) U.S. Cl. ................................. 417/374; 322/1
(58) Field of Search .................................. 417/374, 234, 417/262; 322/1, 7, 28, 29, 8, 10, 14; 290/1 R, 1 A, 1 D

(56) References Cited

U.S. PATENT DOCUMENTS

| 5,180,283 | * | 1/1993 | Vickery, III | 417/234 |
| 5,917,310 | * | 6/1999 | Baylis | 322/1 |
| 6,133,642 | * | 10/2000 | Hutchinson | 290/1 A |

* cited by examiner

*Primary Examiner*—Sang Paik
*Assistant Examiner*—L. Fastovsky
(74) *Attorney, Agent, or Firm*—J. S. Tripoli; F. A. Wein

(57) ABSTRACT

An apparatus includes a manually operable air pump for providing a compressed flow of air to an air motor. An electrical generator is coupled to the air motor and is powered thereby. The generator in turn provides electrical power to a portable electrical device. In one embodiment, device is disposed in a shoe and the air pumping is manually provided by the user's walking or running. In another embodiment, the air pump comprises squeegy devices for each hand of a runner or walker.

14 Claims, 6 Drawing Sheets

MANUALLY-POWERED APPARATUS FOR POWERING A PORTABLE ELECTRONIC DEVICE

CLAIM OF PRIORITY

Priority is claimed from U.S. provisional application No. 60/105,719 filed Oct. 27, 1998.

FIELD OF THE INVENTION

The present invention relates to electrical devices for generating electrical power by manual operation, i.e., by physical labor of the operator. More specifically, the present invention relates to the manual generation of electricity for powering radios, CD players, and other portable electronic devices.

SUMMARY OF THE INVENTION

Briefly, one aspect of the present invention includes apparatus and method for a manually operable air pump or bulb providing a compressed air flow. An air motor rotates in response to the compressed air and drives an electrical generator which provides electrical power to a portable electronic device. Other embodiments include a shoe for providing compressed air by the running or walking operation of the operator or squeezing devices for being squeezed by a runner or walker.

DESCRIPTION OF THE PREFERRED EMBODIMENTS

Figure 1:
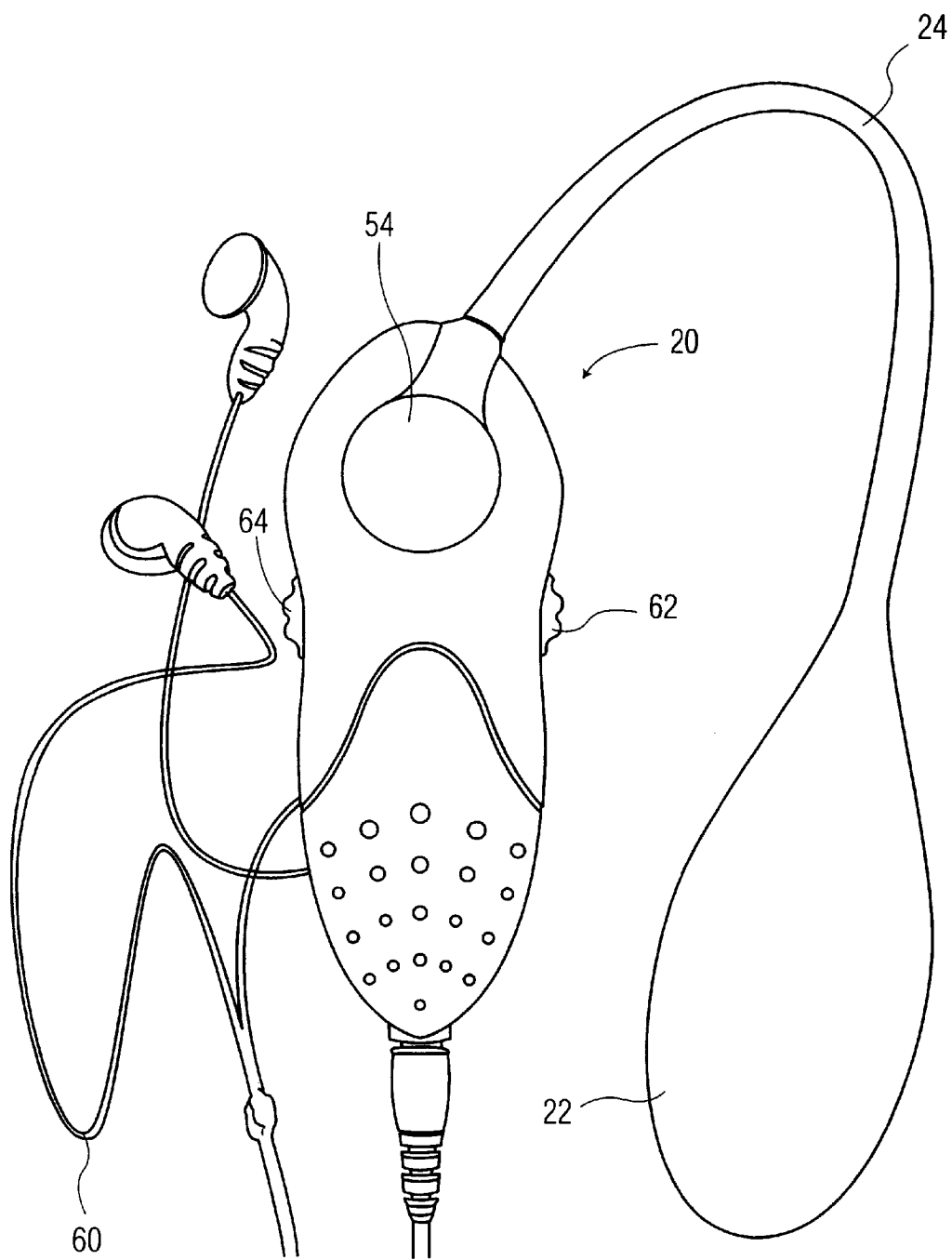
FIG. 1 is a front perspective view of an apparatus according to one embodiment of the present invention.

Reference will now be made to the drawings.

The present invention relates to apparatus and methods for powering a portable electronic device, such as a radio or CD player, by manual operation e.g., hand or foot operation. The present invention will appeal, in particular, to consumers that enjoy exercising, and who wish to use electrical power created by their exercise and is considered to be environmentally friendly. However, the present invention may also appeal to other users in situations where batteries are not available or cannot be recharged.

In one embodiment, the present invention includes a portable electronic device that is carried by the user. The apparatus may be strapped to the user, or carried within a pocket, or transported in some other manner. The apparatus includes means for compressing air by hand, such as a squeezable bulb, or a piston slidable within a cylinder by thumb or finger action. Examples of such piston and cylinder arrangements can be found within U.S. Pat. Nos. 4,763,802, 5,294,010, and 4,334,839, all incorporated herein by reference.

Air compressed by the compressing means is provided by a flexible passageway to an air motor. The air motor may be of a fan-type, in which the momentum of the compressed air is reacted against and turns a fan blade, a turbine type, in which the compressed air is blown on a plurality of turbine blades, or of the type known to be used in air tools, but suitably resized for the lower flow rates and pressures available by hand operation.

The air motor is rotatably coupled to an electrical generator. This coupling may include a reduction or speed increase mechanism for those embodiments in which the air motor turns at a rotational speed undesirable for the electrical generator. In such cases, the coupling may be a series of pulleys, an arrangement of gears, or other apparatus known to those of ordinary skill in the art for converting a first rotational speed to a second rotational speed. In some embodiments, the air motor may be directly coupled to the generator.

Another option is to use a finned flywheel as an air motor with the flywheel being unitary with the generator. In such a case, the moving air would intercept the fins or similar structures on the flywheel, and be moved thereby, thus powering the generator. The electrical generator is of conventional design, well-known to those of ordinary skill in the art.

In one embodiment, a single squeeze of the bulb by hand provides a pulse of power by causing the air motor and generator to accelerate from a start and decelerate to a stop. Preferably, the amount of power produced from the start to the stop of the rotational movement of the generator is more than the average power required by an attached electrical device, such as a radio or CD player, during that same period of time. Any power generated in excess of that required to drive the portable electronic device is preferably stored in a battery. By sizing the typical output of the generator to be in excess of the device requirements, the storage battery is charged for powering the device during those periods in which the generator is not sufficiently turning. However, the present invention also contemplates embodiments in which no storage battery is used and the device is powered only by operation of the generator. The present invention also includes embodiments in which the generator provides excess power to one or more capacitors, the capacitors providing brief periods of electrical power when power from the generator is inadequate for powering the electrical device.

The device is preferably packaged within a housing which is both light weight and rugged, and thereby suitable for being transported by the user. In one embodiment, the housing includes a transparent or semi-transparent window to enable the user to see the rotational operation of the air motor.

In another embodiment, the hand apparatus is sits on a desk or table. Because it is generally not carried, this embodiment may be somewhat heavier and larger than the embodiment previously described.

Figure 2:
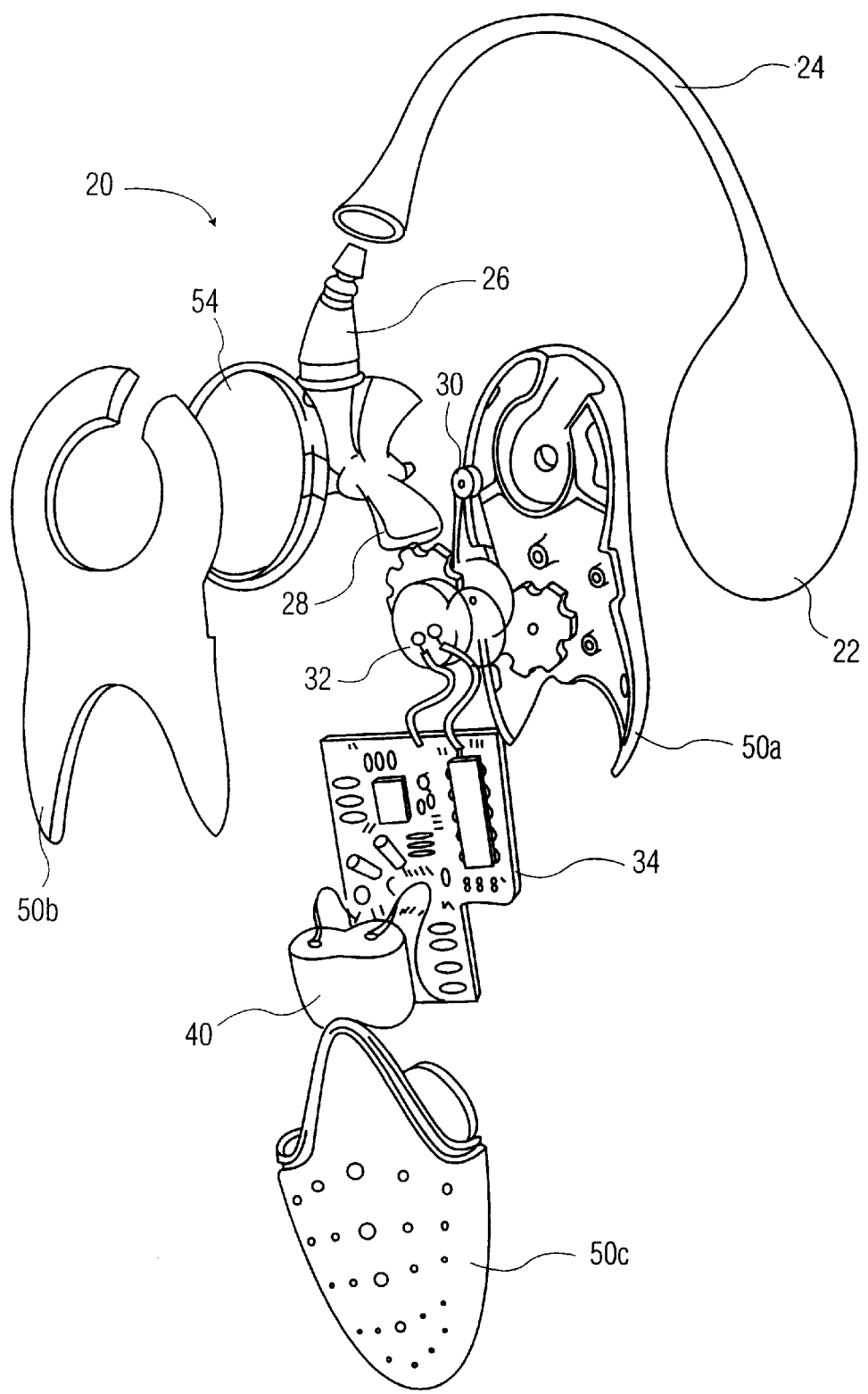
FIG. 2 is an exploded, schematic representation of the apparatus of FIG. 1.
Figure 3:
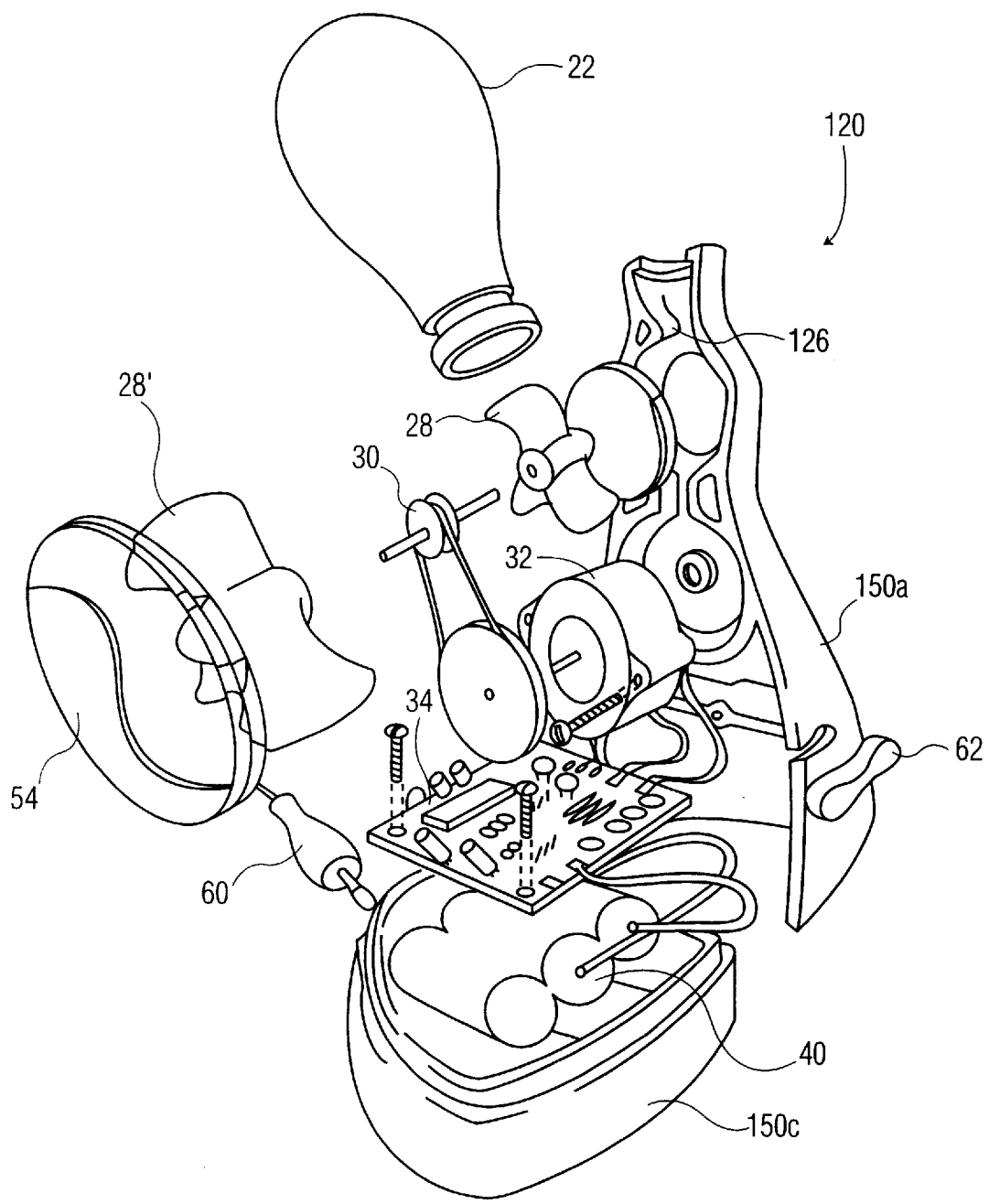
FIG. 3 is an exploded schematic representation of the another embodiment of the apparatus of FIG. 1.

FIGS. 1, 2 and 3 depict one embodiment of the present invention. An apparatus 20 includes an air pump 22. Preferably, air pump 22 is a bulb squeezable by hand, which compresses a flow of air when squeezed. Air flows from the atmosphere into the bulb by way of a widely known check valve (not shown) when the bulb is collapsed and enlarging to its unsqueezed state. The check valve also prevents the flow of air out from the bulb when the bulb is squeezed. Bulb 22 is in fluid communication by flexible passageway 24 with nozzle 26. Nozzle 26 directs the flow of air in a proper orientation onto the air motor. In some embodiments of the present invention, nozzle 26 is a converging nozzle, such that the air exiting the nozzle is accelerated to a higher velocity.

Air exiting nozzle 26 is received by air motor 28, which rotates in response to the flow of air. In one embodiment, air motor 28 includes a plurality of curved fan blades or turbine blades. In another embodiment, air motor 28 rotates about a shaft that includes a first pulley coupled to a second pulley by a drive belt so that the relative sizes of the pulleys permit air motor 28, rotating at a first speed, to power the rotation of a generator 32 at a different speed. Although FIG. 2 depicts the first pulley as being smaller than the second pulley and thus affecting a speed reduction, the present invention contemplates other pulley arrangements including where the pulleys are of approximately the same size, so as to permit the generator to be located on a different shaft than the air motor. The present invention also contemplates those embodiments in which the generator and air motor are located on the same shaft, or rotate about a common axis.

Electrical generator 32 thus rotates in response to rotation of air motor 28, and provides electrical power to a portable electronic device 34. Electronic device 34 may be, for example, a CD player, requiring about 0.6 watts for operation, or an AM/FM radio requiring about 0.4 watts for operation.

In a preferred embodiment, generator 32 also provides power to rechargeable batteries 40 which provide means for storing excess power created by generator 32, and smoothing out voltage peaks otherwise created by the non-uniform rotational speed of generator 32. Batteries 40 thus function as a type of voltage regulator. However, the present invention also contemplates the incorporation of a separate voltage regulator which not only smoothes the voltage transients from generator 32, but which also includes a provision for charging batteries 40 from a power main or a solar cell. Preferably, batteries 40 are of the nickel cadmium type, but may be other types of rechargeable batteries.

The air motor, generator, portable electronic device and batteries are supported within housings 50a, 50b and 50c. Housing 50b includes a transparent or semi-transparent window 54 for observing the operation of the air motor and/or generator. One of housings 50a, 50b, or 50c include an air exit for permitting the outflow of air that has exited air motor 28.

Apparatus 20 also includes volume control 62 and tuning control 64, for example, and other controls as required by device 34. Headphones 60 provide sound from device 34 to the user.

Another embodiment of the present invention is depicted in FIG. 3. An apparatus 120, suitable for sitting on a desk or table, is shown. Apparatus 120 is similar in many respects to apparatus 20, as indicated by the use of the same element numbers. Apparatus 120 includes a nozzle 126 incorporated into housing section 150a. Apparatus 120 also includes a second air motor 28', with pulley mechanism 30 being located in between air motors 28 and 28'. Housing base 150c is preferably wide and stable so as to support apparatus 120 on a desk or table.

Figure 4:
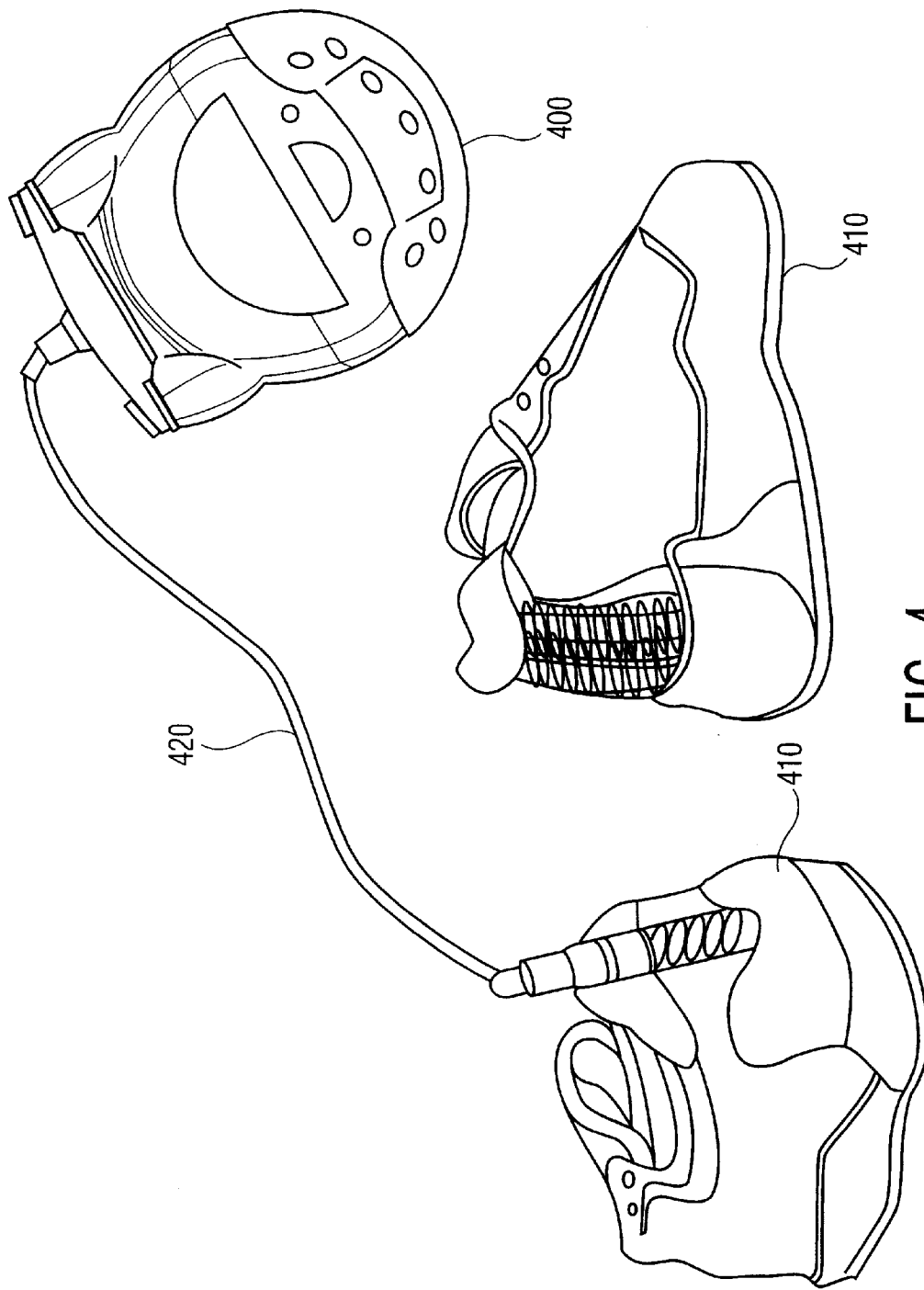
FIG. 4 is a perspective view of a the device of FIG. 1 being powered by and disposed within a shoe for providing generated electrical energy to a portable CD player.

FIG. 4 shows another embodiment of the present invention wherein the electronic device 400 is provided by electrical power from a shoe 410 having inflatable chambers disposed within the sole/heel of the shoe. The shoe produces an electric current by increasing air pressure in the shoe's air chambers when the user walks or runs. The motion of the shoe provides the air pressure to induce a small fan at the rear of the shoe to spin and cause a small electric current, which when harnessed, could be used to power small electronic devices such as a portable CD player by conductor 420.

Another option is to use the shoes as the compressed air producing bulbs and using tubing, provide the compressed air to the air motor and generator worn on a belt or other garment.

Figure 5:
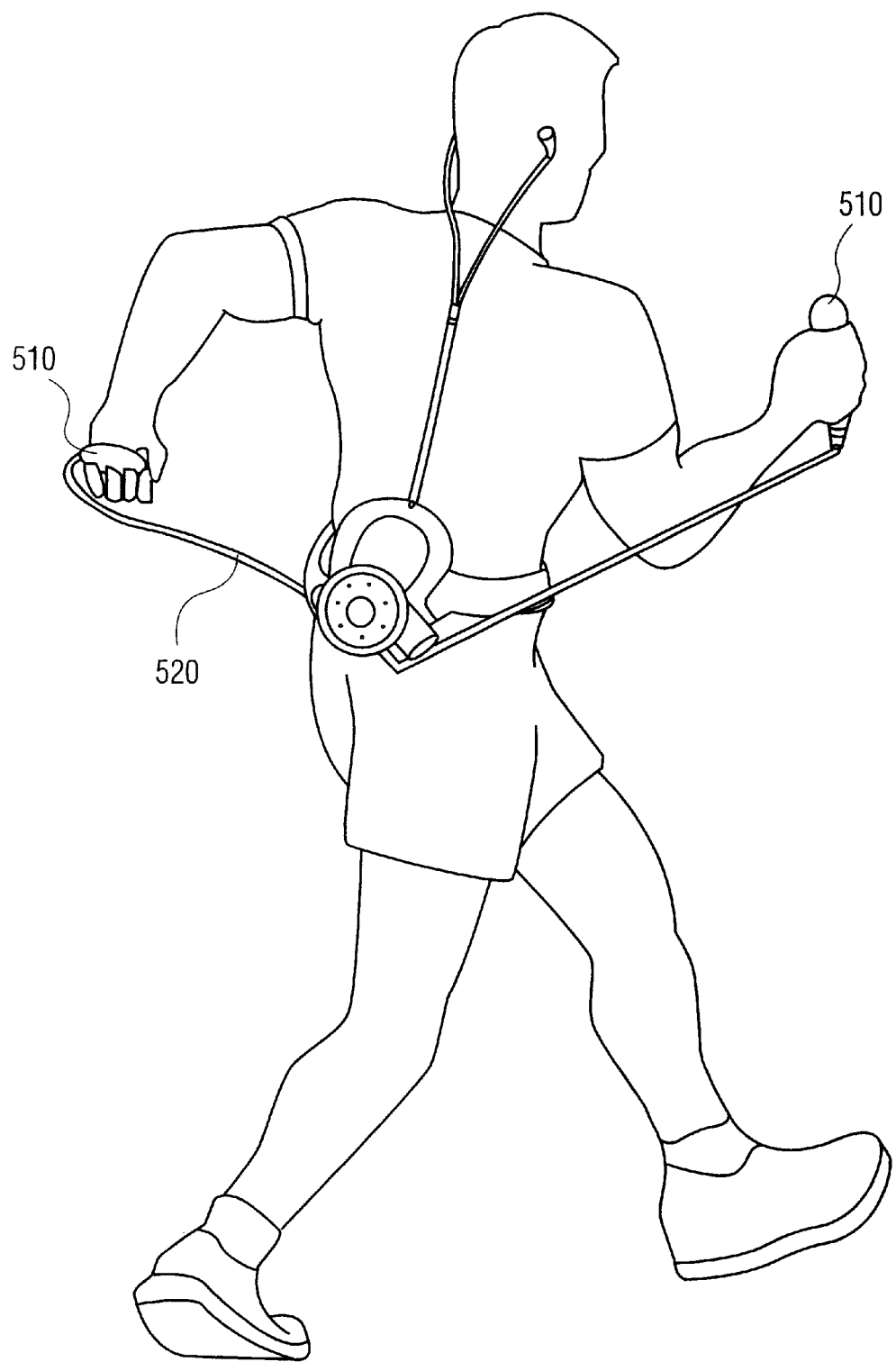
FIG. 5 shows another embodiment of the device of FIG. 1.
Figure 6:
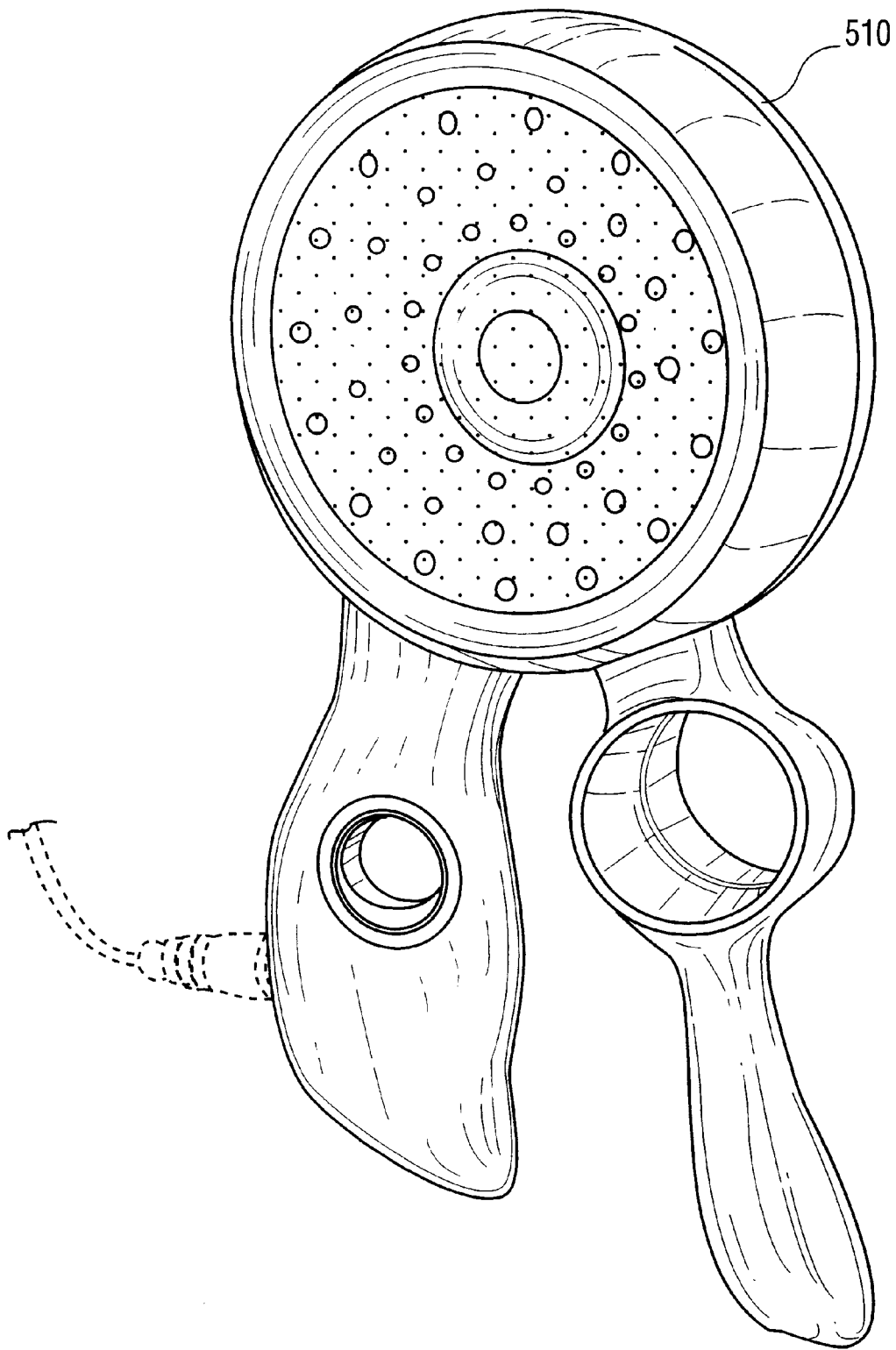
FIG. 6 is a squeeze bulb for use in the device of FIG. 6.

FIG. 5 shows a further embodiment of the present invention wherein the electronic device is powered by air pumps which are squeegy devices 510 shown in FIG. 6 and are alternately squeezed by a runner or walker as they exercise. In such an instance, the air pump devices each require check valves between bulbs as well as to enable inflation of the pump bulbs. For such an apparatus and any of the other embodiments, the air motor can be a flywheel unitary with the generator.

A further embodiment of FIG. 5 is for the devices 510 to be handles and the manual power is provided by wires or ropes 520 which physically operate a flywheel unitary with the generator by alternately pulling on the handles. In such an arrangement, the flywheel can be grooved like a pully with the wire or rope within the groove having enough friction to turn the flywheel and thus generate electrical power.

It is also within the contemplation of the present invention that other means of electrical generation can be used. One such means is by the use of piezoelectric devices, e.g., ceramic piezoelectric devices made of lead-zirconate-titanate (PZT)or polymetic piezoelectric devices which generate electricity in response to mechanical pressure or strain.

What is claimed:

1. An apparatus for powering an electronic device comprising:
    an air pump means which compresses a flow by manual operation;
    said air pump means comprising a selected one of an air bulb sgueezeable by hand and a shoe with an inflatable cushion sgueezeable by foot; and
    an electrical generator coupled to said air motor and rotating in response thereto, for generating electrical power which is providable to a portable electronic device, said electrical power being available for use immediately upon compression of said air by said air pump means.

2. The apparatus of claim 1 which further comprises a rechargeable battery chargeable by electrical power from said generator.

3. The apparatus of claim 1 wherein said portable electronic device is a radio or a compact disc player.

4. The apparatus of claim 1 wherein said air bulb includes a nozzle.

5. The apparatus of claim 4 wherein said nozzle is a converging nozzle.

6. The apparatus of claim 1 which further comprises a check valve which opens to permit air flow into said air pump and which closes to restrict air from flowing back out of said air pump.

7. The apparatus of claim 1 which further comprises one of a pulley mechanism and a gear train for coupling said generator to said air motor.

8. The apparatus of claim 1 which further comprises a battery for storing generated electrical power.

9. The apparatus of claim 1 wherein the air motor is a flywheel with air flow intercepting means.

10. The apparatus of claim 9 wherein the flywheel is unitary with the generator.

11. A method comprising:

compressing air by squeezing a pair of air bulbs held in respective hands of a user to generate an air flow to cause rotation of an air motor;

blocking air flow between said air bulbs;

rotating an electrical generator powered by the air motor immediately upon compression of said air; and powering a portable electronic device from the power generated by the generator.

12. The method of claim 11 which further comprises storing generated electrical power in a battery.

13. An apparatus for powering an electronic device comprising:

an air pump which compresses air by manual operation;

means for conducting the air from said air pump to an air motor; said air motor rotating in response to the flow of air;

an electrical generator coupled to said air motor and rotating in response thereto, said generator being able to provide electrical power to a portable electronic device immediately upon compression of said air by said air pump, the apparatus, including the air pump, the air flow conducting means and the generator, being disposed within a shoe and manually operated by walking or running of the user.

14. An apparatus for powering an electronic device comprising;

an air pump which compresses air by manual operation, the air pump comprising at least a pair of squeegy devices held in respective hands of an operator and alternately squeezed;

check valve means disposed between the squeegy devices for preventing air flow therebetween;

means for conducting a flow of air from said air pump to an air motor, said air motor rotating in response to the flow of air; and an electrical generator coupled to said air motor for receiving flowing air therefrom and rotating in response thereto, said generator being able to provide a source of electrical power to power a portable electronic device.

* * * * *